United States Patent [19]
Ng

[11] Patent Number: 5,274,989
[45] Date of Patent: Jan. 4, 1994

[54] ROTARY RAKE-TYPE LEAF COLLECTOR

[76] Inventor: Kim K. Ng, 381 Mark Tree Rd., Setauket, N.Y. 11733-1030

[21] Appl. No.: 909,307

[22] Filed: Jul. 6, 1992

[51] Int. Cl.$^5$ .............................................. A01D 7/00
[52] U.S. Cl. ................................ 56/362; 56/400.02; 56/400.11
[58] Field of Search ............ 56/362, 351, 352, 400.02, 56/400.04, 400.06, 400.07, 400.08, 400.11, 400.21; 404/129, 131; 172/21, 547

[56] References Cited

U.S. PATENT DOCUMENTS

| | | | |
|---|---|---|---|
| 3,451,488 | 6/1969 | Taketa | 172/547 |
| 3,934,390 | 1/1976 | Ballard | 56/400.02 |
| 3,947,912 | 4/1976 | Michaels | 56/400.02 X |
| 4,974,406 | 12/1990 | Russ | 56/351 |

*Primary Examiner*—Terry Lee Melius

[57] ABSTRACT

A lawn-cleaning device for picking up debris, comprising a rolling drum and spikes, tines and the like for collectively piercing leaves and the like includes an improved means for periodic protrusion and retraction of the spikes, tines or the like through spaced apart suitably-shaped openings in the rolling drum. Leaves and the like are pierced for collection on the spikes during protrusion and debris pierced by the spikes is released from the spikes and collected in a debris receiver during retraction. The improved means includes an array of spaced-apart spikes extending radially from a cylindrical element that is rotational about its cylindrical axis and is supported inside the rolling drum with its axis of rotation parallel to the axis of rotation of the drum. The spikes are adapted to retractible protrusion from the interior through spaced-apart openings in the cylindrical wall of the drum, whereby both the cylindrical element and the drum rotate in the same rotational sense with each one of the spikes periodically penetrating through and retracting through openings in the wall of the rotating drum.

6 Claims, 1 Drawing Sheet

ROTARY RAKE-TYPE LEAF COLLECTOR

FIELD OF THE INVENTION

A gardening device which is used to clear the leaves off the lawn.

DESCRIPTION OF THE PRIOR ART

In the invention of U.S. Pat. No. 3,947,912, of title 'manually operated sweeper' in which a drum, populated with brushes, is used to sweep the leaves into a receiving area. In another related U.S. Pat. No. 3,934,390, entitled 'Debris collector' which uses a drum and mechanically controllable pokes to pick up and release the debris when necessary. This method is not a continuous uninterrupted operation for picking up and releasing the debris.

It is an object of this invention to devise an effective means to clear the leaves off the lawn continuously.

SUMMARY OF THE INVENTION

The invention uses two cylindrical drums, one drum has the tines, the other has many openings, so that the leaves could be picked up and released later when the tines are retracting from the openings of the other drum.

The cylindrical drum which houses a smaller drum, has many openings on its surface. The smaller drum is rotated about an axis which is displaced from the rotating axis of the bigger drum. The smaller drum is populated with sharp tines and the tines could move freely in and out of the openings. The leaves are picked up by the tines, the tines which pick up the leaves are gradually retracting from the openings if the drum is further rotated. Thus, the leaves are pushed away from the openings when the tines are fully retracted from the openings. The droppings could be collected and disposed of later.

DESCRIPTION OF THE PREFERRED EMBODIMENT

Figure 1:
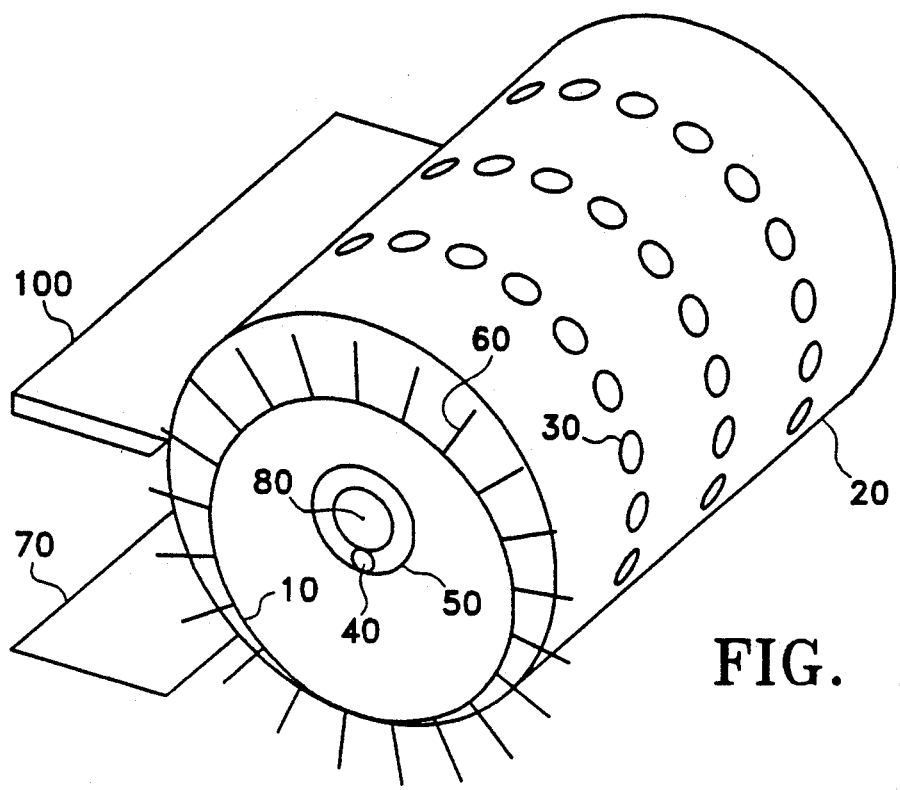
FIG. 1 is a simplified diagram of a preferred embodiment of the invention for a device which uses two cylindrical drums for picking up and releasing the leaves.
Figure 2:
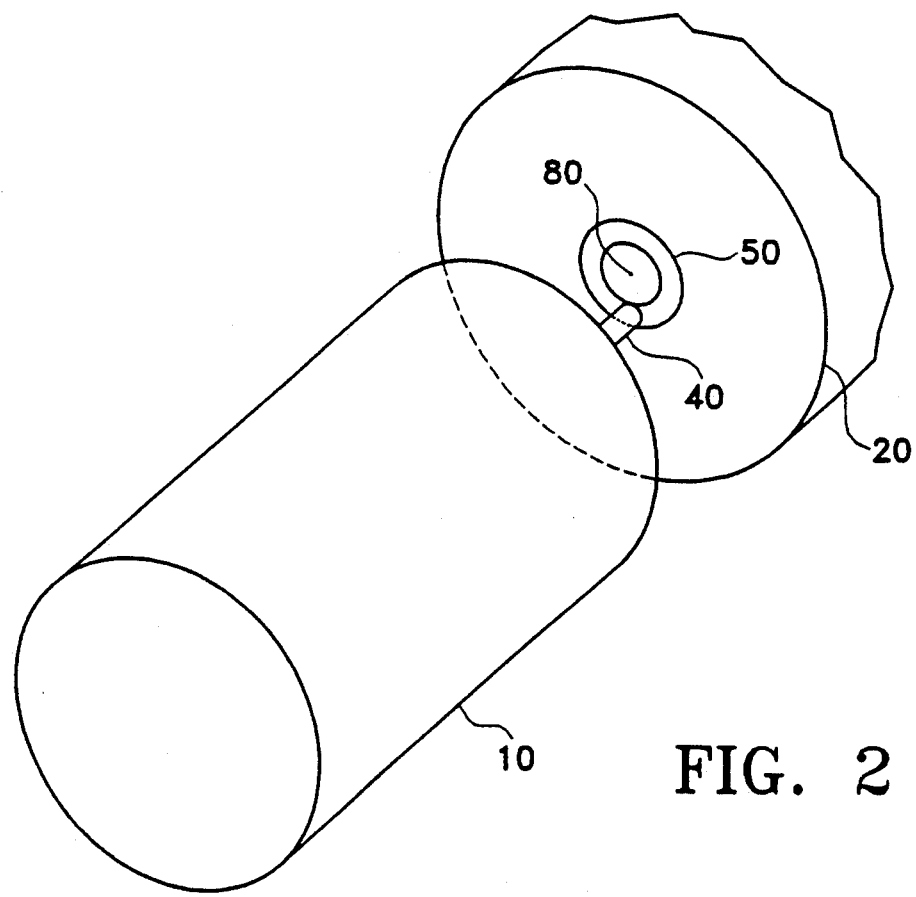
FIG. 2 is a simplified diagram of a preferred embodiment of the invention for displaying the relative configuration of the two cylindrical drums.

As shown in FIG.(1), a cylindrical drum 10, populated with spaced sharp tines 60, is free to rotate inside a bigger drum, 20. The bigger drum 20 is populated with many openings 30 whose size is such that the tines are allowed to move in and out freely when the drums are rotated. The radius of the drum 10 should preferably be integer multiple of the number of the tines on its circumference, multiplied by the radius of the bigger drum, divided by the number of openings 30 on the bigger drum's circumference. This would make sure that the tines match the openings 30 properly through repetitive rotations.

When the drum 10 is rotated, its sharp tines pick up the leaves. The tines are retracting from the openings 30 of the bigger drum 20 when the drum 10 is further rotated and the tines are moved to an elevated position. The leaves are eventually pushed away from the tines when the tines are completely retracted from the openings 30.

The leaves are collected in the receiving area 70. These droppings could be disposed of eventually, or be transferred to a container or a bag by a vacuum pump connected to the receiving area.

The drum 10 has a rotation axis displaced from that of the bigger drum 20. The axle 40 of the drum 10 is constrained to move about the center 80 of the bigger drum 20. Thus, as shown in FIG. (2), the axle 40 of the drum 10 traces out a circular path 50 on the side of the bigger drum 20.

Free and smooth movement of the axle 40 of the drum 10 can easily be accomplished using the bearings. Alternatively, the cylindrical area 50 can be made a smooth and hollow area on the side of the bigger drum 20, so that the axle 40 of the drum 10 is constrained to move in a predictable manner.

In another scheme, the drum 10 is made to rotate, either by a motor or the motion of the wheels which rotate on the terrain. Thus the bigger drum 20 is constrained to move accordingly. In this case, the cylindrical area 50 could be an opening through which the axle 40 of the drum 10 is extended outside the bigger drum 20. The axle 40 of the drum 10 could thus be connected to a motor outside the drums. The opening 50 in this case could be packed with small and smooth steel balls for smooth rotation of the bigger drum 20.

The same description on the relative configuration of the drums applies to the opposite end of the drums.

Referring back to FIG. (1), when one drum is rotated, the other drum is made to rotate by the presence of the tines which poke through the openings 30 on the bottom part of the bigger drum 20. Some hardened spikes can be used to replace some of the tines to ensure synchronized motion of the drums.

An intercepter 100 which is positioned near the outer surface of the bigger drum 20 can be added to prevent the leaves and the wastes from sticking on the outer surface of the bigger drum 20, this effectively blocks the wastes from rolling over to the other side of the bigger drum 20. The intercepter 100 can be made of brushes or a rake. The spikes of the rake can be positioned between the openings 30, so as not to stop the bigger drum 20 from rotating.

A control handle (not shown) with appropriate mechanical means can be used to adjust the vertical position of the drums relative to the ground, so that the drums can be moved up or down to suit different terrain conditions.

Having described the invention and its preferred mode of operation in sufficient detail for those of normal skill in the art to practice the same, it will be obvious to such practitioners to make certain changes and variation in the specific elements for the disclosed embodiments without departing from the scope of the invention. For this reason, the scope of the invention should not be limited by that which has been illustrated herein but should be limited only by the scope of the appended claims.

I claim:

1. In a device of the type for picking up debris from lawns and the like, which device comprises a cylindrical drum, height-adjustably supported for rotation about its axis of rotation by a frame means for transport in debris-cleaning relationship with lawns and the like, whereby a spiked means comprising sharp debris-piercing elements extending radially from said axis of rotation, retractibly protrude through associated openings in the cylindrical wall thereof and cooperate with said drum for picking up said debris comprising paper, leaves and the like on the said debris-piercing elements when said elements protrude through said openings and to remove said debris from the said elements for collection in a receiver for same during selective manual retraction of said elements, the improvement whereby debris is automatically and continuously removed from said elements during transport of said frame means while in said debris-cleaning relationship, comprising:

a) means defining a cylindrical element rotational about a cylindrical axis, said cylindrical element mounting a plurality of spaced-apart tines extending radially from said cylindrical axis;

b) means defining an outer drum having a hollow interior with a second axis of rotation and a cylindrical interior wall surface adapted to engagement with said cylindrical element, said second axis of rotation and said cylindrical axis being in parallel spaced-apart relationship, said outer drum having a plurality of spaced-apart openings in said wall adapted to the periodic reciprocating penetrating passage therethrough of said tines during rotation of said outer drum;

c) means defining a receiver for said debris removed from the said tines as the said tines are being withdrawn into the said interior of said outer drum, said receiver for debris being mounted on said frame means in debris-receiving relationship with said outer drum as determined by the locus where said tines completely retract from the exterior of said openings;

d) means for adjusting the height of said second axis of rotation relative to said lawn or the like; and, e) means defining an intercepter for removing any said debris adhering to the surface of the said outer drum.

2. The improvement of claim 1, wherein said cylindrical element is rotationally driven as the said frame means is transported in said debris-cleaning relationship.

3. The improvement of claim 1, wherein said outer drum is rotationally driven as the said frame means is transported in said debris-cleaning relationship.

4. The improvement of claim 1, wherein the positions of said tines match the openings on the said outer drum through repetitive rotations of the said outer drum and the said cylindrical element.

5. The improvement of claim 1, wherein said intercepter mean comprises brushes.

6. The improvement of claim 1, wherein said intercepter mean comprises angled spikes.

* * * * *